Figure 1:
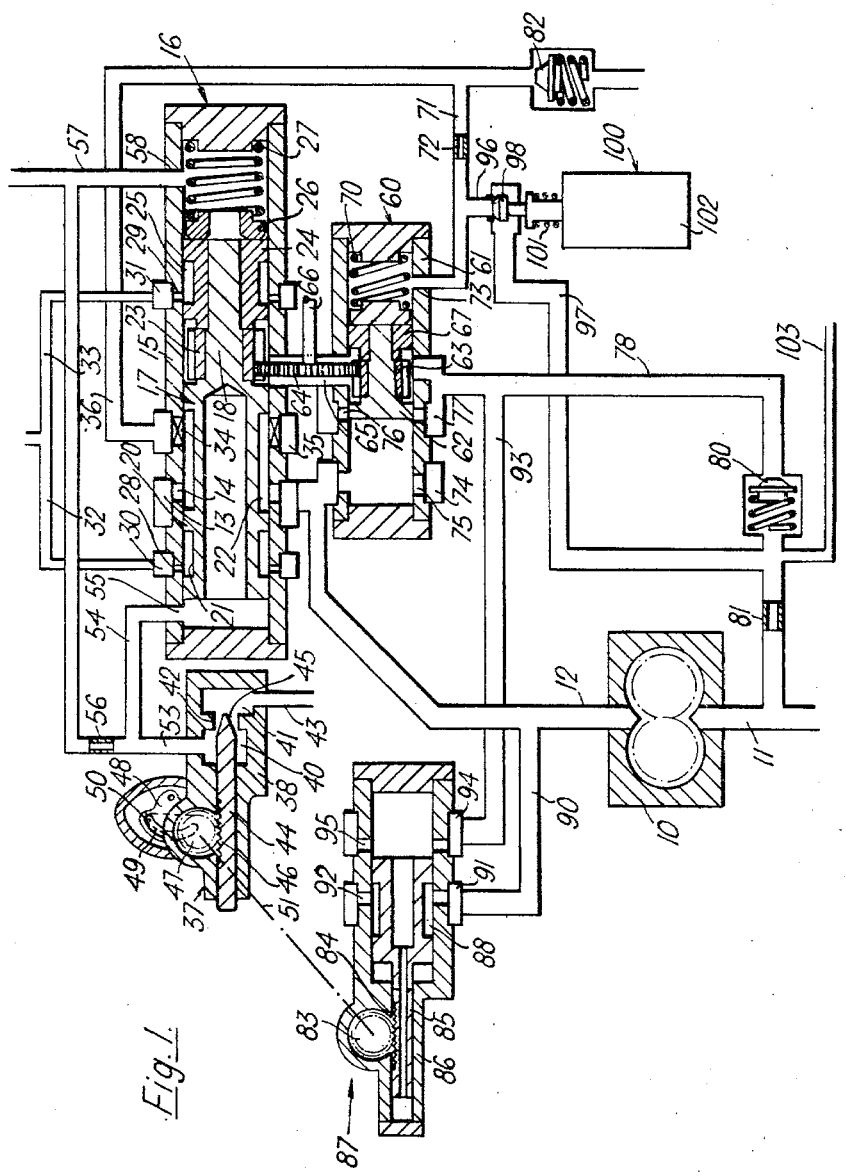

Inventors
Albert Jubb and
Christopher Linley Johnson
By Fred. E. Shoemaker and
Fred L. Witherspoon, Jr., Attorneys

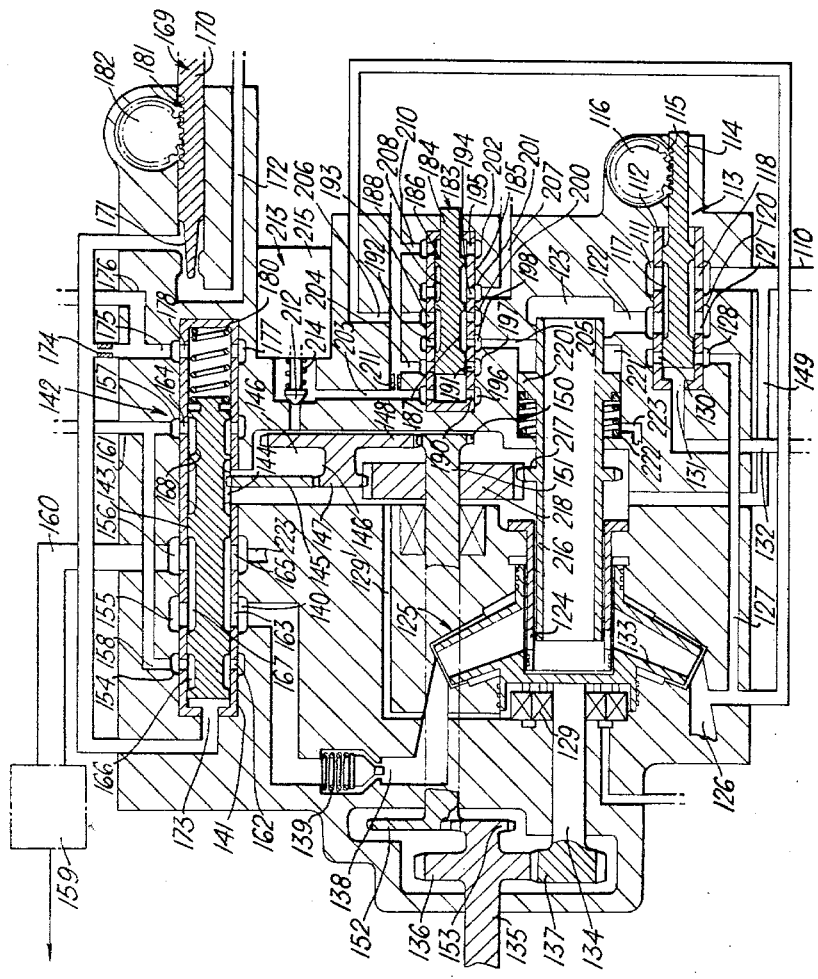

United States Patent Office 3,199,290
Patented Aug. 10, 1965

3,199,290
GAS TURBINE ENGINE AFTERBURNER
FUEL SYSTEM
Albert Jubb and Christopher Linley Johnson, Derby, England, assignors to Rolls-Royce Limited, Derby, England, a company of Great Britain
Filed Oct. 9, 1961, Ser. No. 143,840
Claims priority, application Great Britain, Oct. 12, 1960, 35,000/60
3 Claims. (Cl. 60—35.6)

This invention concerns a fuel system for controlling the supply of reheat fuel to the reheat combustion equipment of a gas turbine engine.

According to the present invention, there is provided a fuel system for controlling the supply of reheat fuel to the reheat combustion equipment of a gas turbine engine comprising a main conduit for conveying fuel from a source thereof to said reheat combustion equipment, a pump for pumping fuel through said main conduit, means for metering the flow of fuel through said main conduit, means for preventing flow through said main conduit whenever the engine rotational speed is below a predetermined speed, said predetermined speed being substantially below the maximum engine speed, and flow control means which are settable in an operative condition in which flow through said main conduit to said reheat combustion equipment is permitted and in an inoperative condition in which such flow is prevented, whereby when the engine speed is between its maximum and the said predetermined speed reheat fuel may be supplied through the main conduit to the reheat combustion equipment whenever the flow control means are set in the operative condition, and when the engine speed is below the said predetermined speed the supply of reheat fuel to the reheat combustion equipment will always be cut off.

The means for preventing fuel flow through said main conduit may comprise a by-pass passage extending between the low and high pressure sides of said pump, flow through said by-pass passage being controlled by a shut-off valve whose position is related to engine rotational speed.

The flow control means may comprise a flow control valve, said flow control valve controlling flow through a by-pass conduit through which fuel may flow from the high to the low pressure side of the said pump.

If desired, a part of the said by-pass passage may also constitute a part of the said by-pass conduit.

Alternatively, the means for preventing flow through said main conduit may comprise a passage for connecting the high pressure side of the pump to drain and a shut-off valve controlling flow through said passage. In this case, the low pressure side of the pump is preferably connected to a fuel supply source by a conduit flow through which is controlled by the shut-off valve. Moreover in this case the flow control means preferably comprises a flow control valve which controls flow through a conduit through which fuel may flow from the high pressure side of the pump to drain, whilst the flow control valve also preferably controls fuel flow to the pump inlet. The features described in this paragraph are the subject of British patent application Nos. 21,055/60 and 21,056/60 both of which are in the name of Dowty Fuel Systems Limited. United States patent application Serial No. 116,824, now U.S. Patent No. 3,142,259, includes the disclosure of both said British applications.

Preferably pressure regulating means are provided for ensuring that the pressure drop across the metering means is maintained to within a desired range.

The said pressure regulating means preferably comprises a throttle valve which controls flow through a by-pass passage communicating with the main conduit on the high pressure side of said pump, opposite pressure faces of said throttle valve being respectively subjected to pressures prevailing on opposite sides of the metering means.

The flow control valve may, if desired, be arranged to control the position of the throttle valve.

The metering means preferably comprises a throttle valve having oppositely facing pressure surfaces which are respectively subjected to pressures functionally related to engine operating air or gas pressures, and means for varying the pressure applied to one of said pressure surfaces.

Preferably the shut-off valve is connected to the last-mentioned means by means including a lost motion mechanism.

The said pump may be either a fixed displacement pump, such as a gear pump, or a variable delivery pump, such as a centrifugal pump.

Preferably means are provided for effecting relative rotation between the valve members of at least some of the above-mentioned valves and their valve bodies.

A pressurising valve may be provided in said main conduit downstream of the metering means.

The invention is illustrated, merely by way of example, in the accompanying drawings, in which:

FIGURE 1 is a schematic sectional view of one embodiment of a gas turbine engine reheat fuel system according to the present invention, and FIGURE 2 is a schematic sectional view of another embodiment of a gas turbine engine reheat fuel system according to the invention.

The terms "left" and "right," as used in the description below, are to be understood to refer to directions as seen in the drawings.

The reheat fuel system shown in FIGURE 1 comprises a gear pump 10 (or other fixed displacement pump) whose low pressure or suction side is connected by a pipe 11 to a fuel tank (not shown). The high pressure or delivery side of the pump 10 is connected by a pipe 12 to an annular manifold 13 which communicates with angularly spaced apart ports 14 in the valve body 15 of a metering valve 16.

The metering valve 16 has a valve member 17 whose right hand portion 18 is of reduced diameter and whose left hand portion 20 is provided with circumferential recesses 21, 22. Splined onto the valve member portion 18 is a gear wheel 23. There is also mounted on the portion 18 a sleeve 24, of the same diameter as the left hand end of the valve 20, the sleeve 24 having a circumferential recess 25. A spring plate 26 bears against the sleeve 24, a spring 27 being interposed between the spring plate 26 and the right hand end of the valve body 15.

The valve body 15 has ports 28, 29 therein which respectively communicate with annular manifolds 30, 31. The manifolds 30, 31 communicate respectively with drain pipes 32, 33 leading to a tank (not shown), or to a position externally of the engine.

The valve body 15 is also provided with metering slots 34 whose cross sectional area increases axially towards the right. The slots 34 communicate, via an annular manifold 35, with a pipe 36.

A needle valve 37 has a valve body 38 within which are formed chambers 40, 41. The chambers 40, 41 are interconnected by a passage 42. The chamber 41 communicates with a pipe 43 which is supplied (by means not shown) with air at the delivery pressure ($P_2$) of the engine compressor or at a pressure functionally related thereto.

The needle valve 37 has a valve member 44 whose diameter is substantially the same as that of the passage 42 and which has a tapered end portion 45 which extends into the passage 42. The valve member 44 therefore forms with the passage 42 a variable restriction, variation of which is effected by axial movement of the valve member 44.

The valve member 44 is provided with a rack 46 which meshes with a pinion 47 carried by a rotatably mounted plate 48. The plate 48 has an arcuate slot 49 therein. A reheat lever (not shown) has a pin 50 riding in the slot 49.

The plate 48 is mounted on a shaft 51 which is movable by a pilot's throttle lever (not shown). The arrangement is such that when the pilot's throttle lever is in a position corresponding to an engine speed of less than, say, 14,000 r.p.m. (the maximum engine speed being, say, 17,500 r.p.m.), the plate 48 will be in a position such that movement of the reheat lever will merely cause movement of the pin 50 in the slot 49 without any corresponding movement of the pinion 47. Accordingly at speeds below 14,000 r.p.m. the valve member 44 will remain unmoved in the position in which it imposes maximum restriction to flow through the passage 42.

When, however, the pilot's throttle lever is in a position corresponding to a speed between 14,000 r.p.m. and 17,500 r.p.m., movement of the reheat lever will cause movement of the pinion 47, whereby the valve member 44 will be moved towards the left to permit increased flow through the passage 42.

Thus the pressure in the chamber 40 will be $\theta P_2$, where $\theta$ is a function whose value is set by the pilot's throttle lever.

The chamber 40 communicates with a pipe 53 which leads to a pipe 54, the latter communicating with a port 55 at the left hand end of the valve body 15. The pipe 53, which has a fixed restriction 56 therein, also communicates with a pipe 57 which is supplied (by means not shown) with air at a pressure which is the same as or is functionally related to the pressure ($P_4$) in the engine jet pipe. The pipe 57 communicates with a port 58 at the right hand end of the valve body 15.

As will readily be seen, the pressures $\theta P_2$ and $P_4$ act on opposite ends of the valve member 17 and are balanced against each other by the spring 27. The arrangement is such that the position of the valve member 17 is directly proportional to the value of $\theta P_2$.

In FIGURE 1, the parts are shown in the positions in which there is the maximum flow of reheat fuel. In this position, high pressure fuel from the pipe 12 passes into the circumferential recess 22 and the latter is so located relatively to the metering slots 34 as to provide the latter with the maximum fuel supply, this fuel supply passing to the pipe 36.

If, however, the pilot's throttle lever is set to a position corresponding to an engine speed below the predetermined engine speed, the valve member 44 will be disposed in a position to the right of that shown and the pressure in the pipe 53 will therefore fall. Accordingly, the valve member 17 will move towards the left so as to reduce the amount of fuel supplied to the metering slots 34 and hence to the pipe 36.

In both said positions, any air or fuel leaking to the recesses 21, 25 may pass through the ports 28, 29 and pipes 32, 33 to drain.

A by-pass valve 60 has a valve body 61 within which is slidably mounted a valve member 62. Splined onto the valve member 62 is a gear wheel 63. The gear wheels 23, 63 mesh with a gear 64 disposed within a chamber 65, the gear 64 being mounted on an engine driven shaft 66. Thus rotation of the shaft 66 effects rotation (e.g., at 200 r.p.m.) of the valve members 17, 62 within the valve bodies 15, 61 respectively. Such rotation of the valve members 17, 62 diminishes the risk of their sticking within their valve bodies.

Mounted on the valve member 62 adjacent the gear wheel 63 is a sleeve 67, which is the same diameter as the left end of the valve 62, and against which abuts a spring plate. A spring 70 is interposed between the spring plate and the right hand end of the valve body 61.

The pipe 36 communicates with a pipe 71 having a fixed restriction 72 therein. The pipe 71 communicates with a port 73 at the right hand end of the valve body 61, whereby a function of the pressure in the pipe 36 acts, through the spring plate, on the right hand end of the valve member 62.

The pipe 12 communicates via an annular manifold 74 with ports 75 at the left hand end of the valve body 61. Thus the pressure on the high pressure side of the pump 10 acts on the left hand end of the valve member 62. Accordingly the position of the valve member 62 will depend upon the pressure drop across the metering valve 16.

The valve member 62 is arranged to throttle flow through ports 76 leading to an annular manifold 77. The manifold 77 supplies fuel to the chamber 65 so as to provide for the lubrication of the gears 23, 63, 64. The manifold 77 also communicates with a conduit 78 which communicates with the pipe 11 on the low pressure side of the pump 10. The conduit 78 may incorporate a pressurising valve 80, which may be set to pass fuel at a pressure of 60 p.s.i., and a restriction 81.

The output of the gear pump 10 and the rating of the spring 70 are such that there will always be a by-pass flow from the high pressure side of the pump 10 and via the pipe 12, manifold 74, ports 75, 76, manifold 77 and pipes 78, 11 back to the low pressure side of the pump 10. If, however, the pressure drop across the metering valve 16 is above or below a predetermined value, the area of the ports 76 open to fuel flow will respectively be increased or decreased. Accordingly the by-pass valve 60 serves to maintain the said pressure drop substantially constant, e.g., at 50 p.s.i.

The pipe 36, on the downstream side of the pipe 71, is provided with a pressurising valve 82 which may be set to pass fuel at a pressure of at least 130 p.s.i. On the downstream side of the pressurising valve 82, the pipe 36 leads to reheat burners (not shown). The pressurising valve 82 is provided to prevent fuel from entering the reheat burners when reheat is not being employed. In this condition, the pressure on the high pressure side of the pump 10 will be lower than the pressure needed to open the valve 82.

The shaft 51, which is rotated by the pilot's throttle lever, carries a pinion 83 which meshes with a rack 84. The rack 84 is provided on a valve member 85, the valve member 85 being slidably mounted within a valve body 86 of a shut-off valve 87. The valve member 85 has a circumferential recess 88.

A pipe 90 communicates with the pipe 12 on the high pressure side of the pump 10. The pipe 90 also communicates by way of an annular manifold 91 with ports 92 in the valve body 86. A pipe 93, which leads to the conduit 78, communicates by way of an annular manifold 94 with ports 95 in the valve body 86.

When the pilot's throttle lever is in a position corresponding to speeds above 14,000 r.p.m., the pinion 83 disposes the valve member 85 in the position shown in which the circumferential recess 88 communicates with the ports 92 but not with the ports 95, whereby there is no flow from the pipe 90 to the pipe 93. When, however, the pilot's throttle lever is in a position corresponding to speeds below 14,000 r.p.m., the pinion 83 is rotated by the shaft 51 to a position in which the circumferential recess 88 establishes communication between the ports 92, 95. When this occurs all the fuel delivered by the pump 10 will flow through the pipe 90, the shut-off valve 87, the pipe 93 and the conduit 78 back to the low pressure side of the pump 10. Thus at speeds below 14,000 r.p.m. no reheat fuel can possibly be supplied to the reheat burners.

The pipe 71, on the downstream side of the restriction 72, communicates with a pipe 96. Communication between the pipe 96 and a pipe 97 is controlled by a valve member 98 of a solenoid valve 100. The valve member 98 is urged by a spring 101 towards the closed position, energisation of a solenoid 102 of the valve 100 effecting opening of the valve.

The pipe 97 communicates with the conduit 78, in the region between the pressurising valve 80 and restriction 81, and also communicates with a spill pipe 103 leading to the inlet of an engine pump (not shown). This ensures that a proportion of the fuel circulated by the pump 10 passes to the pump of the main fuel system and is replaced by fresh fuel thus preventing overheating.

When the solenoid 102 is de-energised, the valve member 98 is in the closed position as shown and reheat fuel may be supplied to the reheat burners. When, however, the solenoid 102 is energised and the valve member 98 is moved to the open position, the pressure on the right hand end of the valve 62 is reduced so as to be substantially equal to the pressure in the pipe 97. Thus the valve 62 will move to the right, and will spill fuel from the pump outlet back to the pump inlet, whereby insufficient pressure is generated to open the valve 82.

Energisation and de-energisation of the solenoid 102 is effected (by means not shown) upon movement of the said reheat lever. It will be appreciated that a fail-safe arrangement is provided inasmuch as, if the electrical system should break down, the solenoid 102 will be de-energise and the valve member 98 will therefore be in the reheat position.

The reheat fuel system described above has been designed for use in controlling the fuel flow to reheat burners of a vertical lift gas turbine engine of a vertical take-off aircraft. It is proposed to employ reheat in the said gas turbine engine whenever the aircraft takes off or lands and it is desirable that the reheat can be brought into operation even when the engine speed is not at its maximum. The reason for this desideratum is that, when the aircraft is being landed, its weight will vary considerably depending upon the amount of fuel which has been consumed.

In use, if the engine speed is above 14,000 r.p.m., and if the reheat lever is moved so as to close the solenoid valve 100, reheat fuel will be delivered to the reheat burners in a quantity dependent upon the ratio $P_2/P_4$ and upon the setting of the reheat lever and hence of the valve member 44.

Once, however, the pilot's throttle lever is moved so as to reduce the engine speed below 14,000 r.p.m., as will occur after landing of the aircraft, the shut-off valve 87 will cut off fuel supply to the reheat burners even if the pilot has forgotten to move the reheat lever so as to energise the solenoid 102 and even if there is a failure in the electrical supply to the solenoid 102. The delivery flow from the pump 10 will therefore pass to the pump inlet and the pressurising valve 82 will prevent any fuel being supplied to the reheat burners since the back pressure of the pressurising valve 82 will then be greater than the pressure developed by the pump 10.

It may, if desired, be arranged that maximum reheat fuel flow is delivered to the reheat burners when $\theta=0.85$ and that minimum reheat fuel flow at maximum engine speed is a quarter of maximum reheat fuel flow.

Referring now to FIGURE 2, which shows an alternative form of reheat fuel system according to the invention, a fuel inlet pipe 110 is connected to a fuel tank (not shown).

The pipe 110 communicates with an annular manifold 111 which surrounds a valve body 112 of a shut-off valve 113. The shut-off valve 113 has a valve member 114 which is provided with a rack 115, the rack 115 being in mesh with a pinion 116. The pinion 116 is rotatable by a pilot's throttle lever (not shown).

The valve member 114 has a reduced diameter portion 117 which communicates at all times with the manifold 111 by way of ports 118 in the valve body 112. When the parts are in the reheat position shown in FIGURE 2 (i.e. when the engine sped is between, say, 14,000 r.p.m. and 17,500 r.p.m.), the reduced diameter portion 117 also communicates with a annular manifold 120 by way of ports 121 in the valve body 112.

When, however, the pilot's throttle lever is moved into a position corresponding to a speed below 14,000 r.p.m. the pinion 116 is rotated so as to move the valve member 114 towards the right. In this position, the reduced diameter portion 117 no longer communicates with the manifold 120 and fuel is therefore no longer supplied thereto.

The manifold 120 communicates with a pipe 122 leading to a chamber 123 from which fuel may be supplied to an inlet, or "eye", 124 of a high speed centrifugal pump 125. This pump is itself the subject of Dowty Fuel Systems Limited's British Patent No. 842,354 and patent application No. 21,057/60. An annular manifold 126 communicates with the high pressure or delivery side of the pump 125. A pipe 127 communicates at one end with the manifold 126 and at the other end with a manifold 128 surrounding the valve body 112. The valve body 112 has ports 130, 131 therein which communicates respectively with the manifold 128 and with a drain pipe 132.

When the valve member 114 which is the subject of the above-mentioned Dowty Fuel Systems Limited's United States patent application Serial No. 116,824 is in the reheat position shown, it cuts off communication between the ports 130, 131. When, however, the valve member 114 is moved towards the right as a result of the engine speed falling below 14,000 r.p.m., communication between the ports 130, 131 is established. Accordingly the said movement of the valve member 114 towards the right cuts off the fuel supply to the low pressure side of the pump 125 and at the same time connects the high pressure side of the pump to drain.

The pump 125 comprises an impeller 133 which is mounted on a shaft 134 journalled in bearings 129. The shaft 134 is driver from an engine driven shaft 135 by way of gears 136, 137.

The manifold 126 communicates with a conduit 138 which incorporates a pressurising valve 139 and which leads to an annular manifold 140 surrounding the valve body 141 of a metering valve 142.

The metering valve 142 has a valve member 143, a portion 144 of which is provided with gear teeth, the said portion meshing with a gear 145 which is disposed within a chamber 146. The chamber 146 communicates with the fuel inlet pipe 110 by way of a pipe 149 and with the bearing 129 by way of a pipe 129'. Thus fuel from the fuel inlet pipe 110 is supplied to the bearing 129 and gears 144, 145 so as to effect lubrication thereof.

The gear 145 meshes with a gear 147 of a compound gear 147, 148, the gear 148 meshing with a gear 150. The gear 150 is mounted on one end of a shaft 151 whose other end carries a gear 152 which meshes with a gear 153 on the engine driven shaft 135. Thus rotation is effected of the valve member 143 (e.g. at 200 r.p.m.) so as to reduce the risk of the latter sticking within the valve body 141.

Annular manifolds 154, 155, 156, 157, which surround the valve body 141, communicate respectively with a drain line 158, the conduit 138, a pipe 160 leading to the reheat burners (not shown), and a drain pipe 161 which comunicates with the drain pipe 158. The pipe 160 incorporates a pressurising valve 159.

The valve body 141 has ports 162, 163 and 164 therein which communicate respectively with the manifolds 154, 155 and 157. The valve body 141 also has metering slots 165 therein which communicate with the manifold 156. The cross-sectional area of the metering slots 165 increases axially towards the right.

The valve member 143 has circumferential recesses 166, 167, and 168 therein of which the recesses 166, 168 communicate with the ports 162, 164 respectively in all positions of the valve member 143. Thus any air or fuel leakages in the metering valve 142 are passed to the drain pipes 158, 161. The recess 167 is adapted to establish communication between the ports 163 and metering slots 165, the fuel flow through the latter increasing as the valve member 143 moves towards the right.

A needle valve 169 has a valve member 170 which has a tapered portion 171. The tapered portion 171 extends into a passage 172 one end of which is adapted to be supplied with air at the compressor delivery pressure $P_2$ or at a pressure functionally related thereto. The other end of the passage 172 communicates with a port 173 in the left hand end wall of the valve body 141. Thus the left hand end of the valve member 143 is open to a pressure $\theta P_2$ where $\theta$ is a function whose value depends on the position of the needle valve portion 171 in the passage 172.

The passage 172 communicates, by way of a restriction 174, with a pipe 175, the latter communicating with a pipe 176 which is adapted to be supplied with air at the pressure $P_4$, prevailing in the engine jet pipe or at a pressure functionally related thereto. The pipe 175 communicates by way of an annular manifold 177 and ports 178 with the right hand of the valve member 143.

A spring 180, which is interposed between the right hand end of the valve member 143 and the right hand end of the valve body 141, serves to balance the valve member 143 against the resultant force thereon arising from the difference between the pressure $\theta P_2$ and $P_4$.

The valve member 170 is provided with a rack 181 which meshes with a pinion 182. Rotation of the pinion 182 therefore adjusts the position of the valve member 170 and hence of the valve member 143, whereby to vary the fuel flow to the reheat burners through the pipe 160. The pinion 182 is connected to the pinion 116 by means (not shown) corresponding to the lost motion connection between the pinions 47, 83.

A pump by-pass valve 183 has a valve member 184 which is slidably mounted in a valve body 185. The valve member 184 has at its right hand end a shoulder 186 providing a pressure surface. The valve member 184 also has circumferential recesses 187, 188.

The valve body 185 has ports 190, 191, 192, 193, 194, 195 communicates respectively via annular manifolds 196, 197, 198, 200, 201, 202 with pipes 203, 204, 205, 206, 207, 208.

Both the pipes 204, 208 lead to a pipe 201 which is adapted to receive fuel from the high pressure side of the fuel pump (not shown) of the main engine fuel system (not shown). The pipe 210 communicates with the pipe 203 by way of a restriction 211.

The pipe 203 leads to the chamber 146, flow through the pipe 203 being controlled by a valve member 212 of a solenoid valve 213. The valve member 212 is urged towards the closed position by a spring 214, the valve member 212 being moved to the open position on energisation of a solenoid 215.

The pipe 207 is a drain pipe which leads to a fuel tank (not shown) while the pipe 206 communicates with the manifold 126 so as to receive high pressure fuel therefrom.

A valve sleeve 216 is mounted within the chamber 123 and is adapted to throttle flow through the pump inlet 124. The sleeve 216 is provided with a gear 217 which meshes with a gear 218 mounted within the chamber 146. The gear 218 meshes with the gear 147. Accordingly the valve sleeve 216 may be rotated from the shaft 135 (e.g. at 200 r.p.m.) so as to reduce the risk of its sticking within the chamber 123.

The valve sleeve 216 has a flange 220 which acts as a piston within a cylinder 221. A spring 222 it interposed between the left hand end of the cylinder 221 and the left hand end side of the flange 220.

The space within the cylinder 221 to the left of the flange 220 communicates with the annular manifold 156 by way of a pipe 223 (which is, in part, indicated in FIGURE 2 by a chain dotted line). The space within the cylinder 221 to the right of the flange 220 communicates with the pipe 205.

When the valve member 212 of the solenoid valve 213 is closed, i.e. when the parts are in the reheat position, the valve member 184 of the valve 183 will be positioned as shown in FIGURE 2. In this position, the recess 187 communicates the the ports 192, 193 while the recess 188 communicates with the ports 192, 193 while the recess 188 pressure fuel from the manifold 126 will flow via the pipe 206, manifold 200, ports 193, recess 187, ports 192, manifold 198 and pipe 205 to the right hand side of the flange 220, the left hand side thereof receiving fuel from the manifold 156 via 223, 223. The flange 220, and hence the valve sleeve 216, will therefore be positioned in dependence upon the pressure drop across the metering valve 142, with the result that the fuel flow through the pump inlet 124 will be throttled in accordance with the said pressure drop. The said pressure drop can therefore be maintained substantially constant e.g. at 50 p.s.i.

When, however, the valve member 212 of the solenoid valve 213 is opened, the pressure on the left hand side of the valve member 184 is substantially the same as that of the chamber 146 i.e. is substantially the same as that on the low pressure side of the pump 125. The pressure on the shoulder 186 of the valve member 184 is, however, that of the high pressure side of the fuel pump of the main engine fuel system and this pressure is substantially higher than that on the high pressure side of the pump 125.

Opening of the valve member 212 therefore causes the valve member 184 to be forced towards the left so as to bring the recess 187 into communication which the ports 191, 192 and the recess 188 into communication with the ports 193, 201. This will cause the pressure in the pipe 210 to be applied to the right hand side of the flange 220 with the result that the latter will be forced towards the left so as to cause the valve sleeve 216 to close the inlet 124 to the pump 125. At the same time, the high pressure side of the pump 125 will be connected to drain via the manifold 126, pipe 206, manifold 200, ports 193, recess 188, ports 194, manifold 201 and pipe 207.

The operation of the fuel system shown in FIGURE 2 is generally similar to that of FIGURE 1 and therefore will not be described in detail. Since, however, in the FIGURE 2 construction, the high pressure side of the pump 125 is connected to drain when reheat is not being employed and since the fuel supply to the pump is cut off at this time, there will be substantially no heat generation in the fuel system of FIGURE 2 when reheat is not being employed.

We claim:
1. A fuel system for controlling the supply of reheat fuel from a source thereof to the reheat combustion equipment of a gas turbine engine comprising a throttle for controlling engine speed, a main conduit for conveying fuel from the said source thereof to said reheat combustion equipment, a pump for pumping fuel through said main conduit, means for metering the flow of fuel through said main conduit, a by-pass passage communicating with the main conduit on the high pressure side of the pump, a pressure regulating throttle valve which ensures that the pressure drop across the metering means is maintained to within a desired range, said throttle valve controlling flow to the inlet of said pump, a shut-off valve responsive to the throttle setting, said shut-off valve cutting off the fuel supply to the inlet of said pump and permitting flow of fuel through said by-pass passage from the high pressure side of the pump to drain, thus preventing flow of fuel through said main conduit whenever the throttle setting is in a position corresponding to engine speed below a predetermined speed, said predetermined speed being substantially below the maximum engine speed, a by-pass conduit through which fuel may flow from the high pressure side of said pump to drain and a flow control valve which controls flow through said by-pass conduit and controls said throttle valve, said flow control valve being settable in a closed position, in which reheat fuel is supplied through said main conduit to the reheat combustion equipment when said shut-off valve permits such flow, and an open position in which the supply of reheat fuel to the reheat combustion equipment is cut-off.

2. A fuel system as claimed in claim 1 in which said flow control valve, when in its open position causes said throttle valve to close to prevent fuel flowing through the inlet of said pump.

3. A fuel system as claimed in claim 1 in which said flow control valve has oppositely facing pressure surfaces which are acted upon by pressures functionally related to engine operating pressures, a solenoid operated valve controlling the pressure acting on one of said pressure surfaces, and means to energize the solenoid by the movement of a reheat control lever.

References Cited by the Examiner

UNITED STATES PATENTS

| | | | |
|---|---|---|---|
| 2,668,416 | 2/54 | Lee | 60—39.28 |
| 2,708,826 | 5/55 | Torell | 60—39.28 |
| 2,814,928 | 12/57 | Davies | 60—39.28 |
| 2,830,436 | 4/58 | Coar | 60—39.28 |
| 2,858,700 | 11/58 | Rose | 60—39.28 |
| 2,865,166 | 12/58 | Holbrook | 60—39.28 |
| 2,942,416 | 6/60 | Buckingham | 60—39.28 |
| 2,956,576 | 10/60 | McKeggie | 60—39.28 |
| 2,983,100 | 5/61 | Deitrich | 60—39.28 |
| 3,128,598 | 4/64 | Gordon | 60—35.6 |
| 3,142,259 | 7/64 | Tyler. | |

FOREIGN PATENTS 842,354   7/60   Great Britain.

OTHER REFERENCES

Winters: "The Control of Turbojet Engines," Aeronautical Engineering Review, January–June 1955, vol. 14, pages 62–65 and 71.

JULIUS E. WEST, *Primary Examiner.*

SAMUEL LEVINE, *Examiner.*